United States Patent [19]

Engelbart et al.

[11] 3,880,716
[45] Apr. 29, 1975

[54] PROCESS FOR MAKING OPTIMUM CHEMICAL CONVERSIONS AND BIOLOGICAL FERMENTATIONS

[76] Inventors: Wilke Engelbart, Wardenburgstr. 40, Oldenburg; Fritz Engelbart, Hannoversche Str. 62, Anderten ub. Hannover, both of Germany

[22] Filed: Apr. 7, 1972

[21] Appl. No.: 242,045

[30] Foreign Application Priority Data
Apr. 8, 1971  Germany............................ 2118197

[52] U.S. Cl. ................ 195/108; 195/109; 195/116; 195/139; 195/142
[51] Int. Cl. ......................... C12b 1/14; C12k 9/00
[58] Field of Search .......... 195/115, 141, 143, 139, 195/140, 116, 108, 109; 210/150; 261/92

[56] References Cited
UNITED STATES PATENTS

| | | | |
|---|---|---|---|
| 2,715,795 | 8/1955 | Pallotta et al..................... | 195/115 |
| 3,407,120 | 10/1968 | Weiss et al......................... | 195/142 |
| 3,540,589 | 11/1970 | Boris................................. | 261/92 |
| 3,630,848 | 12/1971 | Lefrancois......................... | 195/115 |
| 3,676,074 | 7/1972 | Shibayama et al................. | 195/142 |

FOREIGN PATENTS OR APPLICATIONS
2,012,610   3/1970   France ............................ 210/150

*Primary Examiner*—A. Louis Monacell
*Assistant Examiner*—Thomas G. Wiseman
*Attorney, Agent, or Firm*—Cushman, Darby & Cushman

[57] ABSTRACT

A method for optimizing biochemical and fermentation processes by shortening the diffussion distances between the active agent, i.e., microorganisms, enzymes, or catalysts and the working liquor. This is achieved by adhering the active agent to freely circulating moving solid bodies which have, (1) a large surface area, (2) a specific gravity different than the worked on liquor, and (3) a volume of between 1 to 1,000mm³. The difference in specific gravity between said bodies and worked on liquor allows higher relative speeds which shorten diffussion distances. This fermentation technique seeks to combine the advantages of adhesive and submerged cultivation.

9 Claims, 8 Drawing Figures

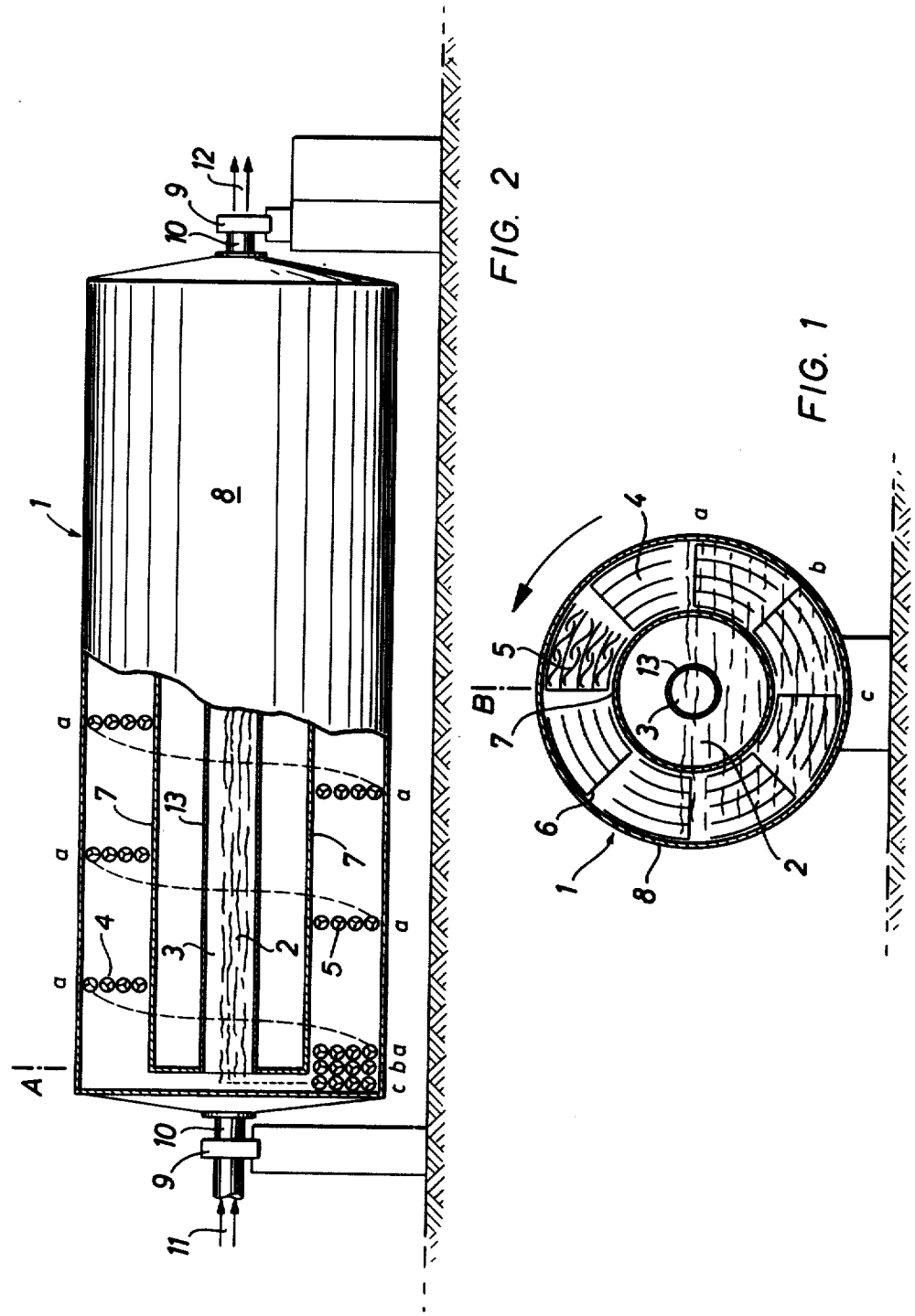

PROCESS FOR MAKING OPTIMUM CHEMICAL CONVERSIONS AND BIOLOGICAL FERMENTATIONS

The invention relates both to continuous and discontinuous fermentation processes as well as to some chemical-physical processes.

In the case of most fermentation processes, the microorganisms become effective in a submerged state, i.e., they are finely dispersed in the culture solution and are kept in suspension by suitable agitating arrangements.

These so-called submerged culture processes are disadvantageous in that, especially in the case of filamentous growing (flake forming) microorganisms, for physical reasons, not all microorganisms are supplied best with the required substances from the nutritive solution and the substances formed cannot be removed quickly enough from the cell surface of the organisms. The reason for this, among others, is to be found in the fact that in the case of the processes that are considered, diffusion plays a decisive role. The diffusion of substances in water is a very slow process, the time required for an equalized concentration being, among other things, dependent on the square of the diffusion distance. Because of the slight difference in density between the microorganism flakes and the solution surrounding them, only low relative speeds (a few mm/sec) between the microorganisms and the solution are possible even in the case of a very turbulent movement of the fermentor content, so that, because of the large diffusion distances, only low diffusion speeds can be achieved, which can limit the metabolism.

The basic object of the invention is to achieve an optimum metabolism of the microorganism and thus to make an optimal fermentation process. The principle for the solution on which the invention is based consists in the fact that care must be taken with suitable arrangements for the production of as high as possible a relative speed (for example 10 – 100 cm/sec) between the microorganisms and the solution surrounding them; but that the diffusion distances be as short as possible and the exchange of substances between the organisms and solution be accelerated.

In order to achieve this it will be necessary to allow the microorganisms to grow on the surfaces of suitable bodies and to allow nutritive medium to flow across these surfaces at an optimal speed. Thus, the principle of the desired fermentation process is to be designated as an adhesive culture in contrast to submerged culture.

It is well known that many microorganisms attach themselves to solid surfaces. For example the so called "trickling filters" or "rotating biodiscs" use the phenomenon. It is well known that yeasts, which normally grow in a submerged state, attach to the walls of a fermentor and that bacteria attach to the surface of ion-exchange resin. In general it can be stated that every surface having contact with a fermentor broth is attached by microorganisms and that filamentous growing organisms form a more or less thick film on such surfaces. If the film grows too thick and/or if the speed of the nutritive medium flowing across the surfaces is too high, the film can detach and normally is split into little flakes. These flakes and/or the thick films can build up obstructions in the surface system as it is well known from trickling filters.

In the case of most fermentations, the microorganisms need nutritive substances which are taken from two phases, an aqueous and a gaseous one. The important thing, therefore, is to bring not only the aqueous phase but also the gaseous phase into close contact with the microorganisms.

Furthermore, it is important according to the invention to have a surface system which is as large as possible for the growth of the microorganisms in a certain fermenter volume but to avoid obstructions in the system which can be conditional on the growth of the microorganisms and to eliminate any obstructions building up on a short term basis.

Beyond that, the invention is to create the possibility for fully continuous processes without interruption by the extraction of the product.

The invention furthermore has for its object the combination of the advantages of the submerged culture where a large biomass works in a certain volume with the advantages of the adhesive culture where the single organisms are better supplied. By suitable measures these advantages are to be made usable for practically all imaginable biological-chemical fermentations but also for conversions of a different type, where an optimal relative speed between substances of various and equal physical conditions is important.

The method of the present invention relates to continuous or discontinuous biological fermentations, wherein the microorganisms adhere to solid surfaces. The method comprises producing optimal relative speeds between the adhering microorganisms and the liquid nutritive medium which can contain gas bubbles. According to the invention this is achieved in the following way: By means of an appropriate guiding device, which includes a large number of hoses or tubes which have a diameter of a few centimeters and which have an internal helical core element, a circulating flow of the nutritive medium is generated, characterized in that microorganisms attaching themselves to the walls and to the surface of the helical core of the hoses or tubes are contacted by the flowing nutritive medium, continuously changing the direction of flow. To this circulating flow of the liquid nutritive medium a number of freely movable bodies are added. The bodies have a volume of about 1 to 1,000 mm$^3$ and may be in the shape of rods or filaments. The bodies have a specific gravity different from that of the nutritive medium so that it is possible to effect flow of the liquid relative to the bodies.

The guiding device needed for circulating the flow of the mixture of nutritive medium, gas bubbles and the freely movable bodies can be the already known devices "rotating pipe filter," as described in U.S. Pat. application Ser. No. 851,376 (1969), now U.S. Pat. No. 3,647,081, or the so called "bio-hanger," both devices being described in a publication of F. Engelbart: "Beitrag zur Entwicklung neuer Techniken auf dem Gebiet der biologischen Abwassereinigung," Wasserund Abwasserforschung 1969/4, 129 – 138. The use of hoses or tubes with a helical core according to the present invention is new.

With respect to the desired fermentation process the bodies mixed with the nutrient broth are to be selected with regard to shape, size and constitution. Because the bodies serve as contact surface for adhering organisms the volume of the bodies will be enlarged by the microbe film.

By means of these bodies the available contact surface for the settling of microorganisms can be enlarged very much and with the aid of the above-mentioned hoses or tubes with a helical core the known devices "dip-in winding arrangement" and "biohanger" can be used as a suitable guidance for the circuit flow of the mixtures of bodies and fermenting broth, with the result that the bodies, having the desired relative speed to the fermenting broth and thus wanting to separate from the broth are remixed continuously. This remixing would not occur in a simple fermentor with simple hoses or tubes.

The main advantage of the method of the present invention is that not only a large quantity of adhesive components can be kept in a small reactor or fermentor, thus resulting in an enlarged yield of a certain reactor volume, but also the yield with respect to the working mass of adhering components can be enlarged. This is because the exchange of substances between the adhering components and components flowing across the surface system is accelerated.

In the following paragraphs a few examples for the practical application of the process according to the invention are given:

1. Catalytic effect of a film of noble metal attached to the surfaces of the hoses, tubes and bodies on reactions in the flowing medium.

2. Production of a large contact surface between adhering films of crude oil and flowing components.

3. Production of an organic mass for the manufacture of feed stuffs on the basis of waste substances.

4. Production of metabolism products, such as acetic acid, citric acid, amino acids, hormones, antibiotics, alcoholic drinks.

In the drawings:

FIGS. 1 and 2 are views of a dip-in winder or drum type of apparatus;

Figure 3:
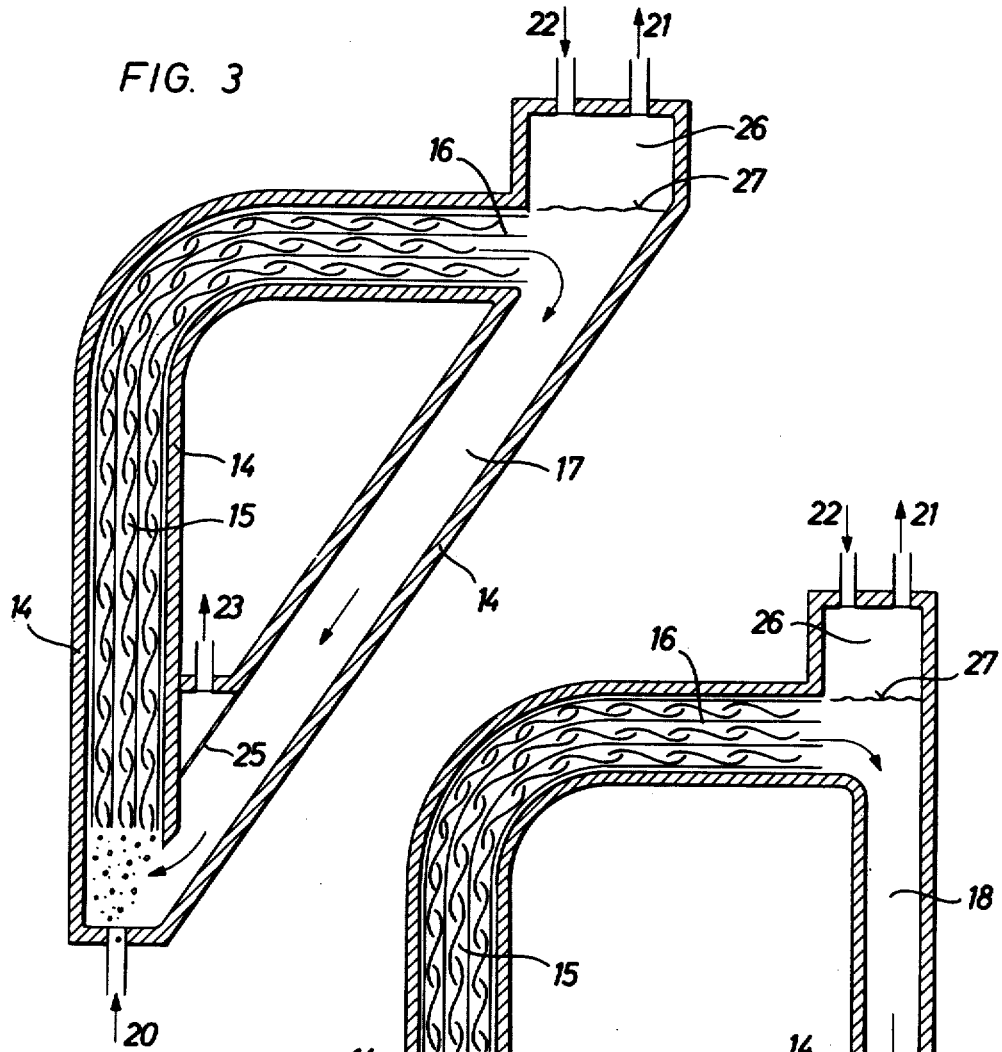
FIGS. 3 and 4 are views of a bio-hanger type of apparatus.

FIGS. 1 and 2 represent an embodiment by way of example for the use of a dip-in winder 1 as a fermentor. The large number of freely moving bodies distributed in the liquid 2 have not been illustrated because of their small size. When the dip-in winder 1 is turned in the direction of the arrow drawn in FIG. 1, the liquid 2 and the gaseous phase 3 are moved to the right by means of hoses 4 in FIG. 2. Spiral flows caused by the helical cores 5 develop inside hoses 4, by which the bodies are prevented from separating from the liquid 2. The hoses 4 are attached to radially running supports 6 and on drum 7 in a suitable manner. The outside position of hoses 4 is surrounded by a jacket 8 which also protects the front and rear of the submerged winder from outside influences. The hollow axle 10 rotates in bearings 9, receiving effectively the feed lines 11 and discharge lines 12. The return tube 13 takes care of a rapid conveyance of the substances from the rear to the front.

Figure 4:
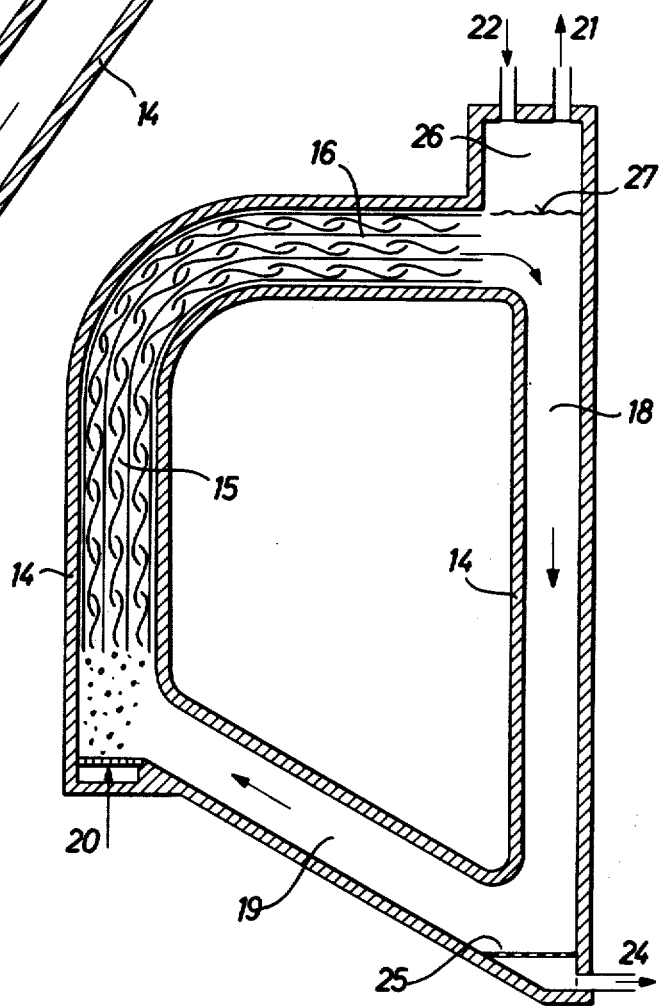

FIGS. 3 and 4 show embodiments by way of examples for a bio-hanger in fermentors with heavy and light particles. FIG. 3 shows an embodiment by way of example for a fermentor with particles heavier than the liquid surrounding them, in the case of FIG. 4 the bodies being lighter than the liquid. 14 are the walls of the fermentors, 15 the bio-hangers, which are equipped best with spiral core tubes 16 for mixing liquids and bodies and for other purposes.

By a suitably arranged gas supply 20, the gas is blown in such that it must rise in biohanger 15, whereby the liquid and the particles (not illustrated because too small) contained therein are carried along by the mammoth pump action. The return flow 17, 18, 19 takes care of a circulation, the main directions of flow being characterized by arrows. In FIG. 4 a narrow descending part 18 has been drawn, in which the speed of flow is so high that the light bodies are dragged along. In the rising part 19, a mammoth pump action develops as a result of the particles, which action still is further bolstered by the gas bubbles ascending in the biohanger 15. The blown in gas can escape from the defoaming chamber 26 above the liquid level 27 through the gas discharge line 21 and can be sent to the ventilating system. The liquid supply 22 bolsters the defoaming, the liquid discharge lines 23, 24 being so attached that bodies cannot leave the fermentor unintentionally, a strainer 25 as a safety measure being built in. The return flows 17, 18, 19 also can be equipped with a biohanger attachment according to need.

FIGS. 5 – 8 describe the helical core tubes at an enlarged scale shown on FIGS. 1 and 2 under number 5 and in FIGS. 3 and 4 under number 16.

Figure 5:
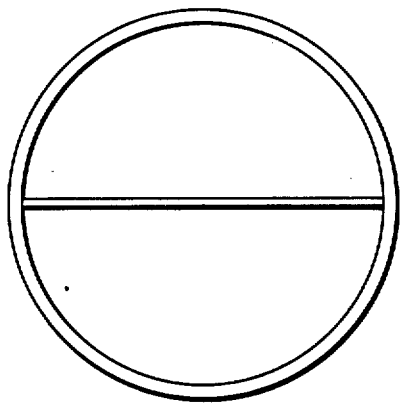
FIGS. 5, 6, 7 and 8 are enlarged views of the tubes employed in the devices of FIGS. 1 – 4.
Figure 6:
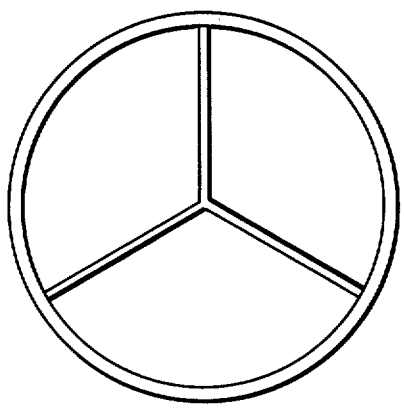

FIGS. 5 and 6 show a cross section through a helical core tube in which the conductive surface (the core) constitutes a straight line or a star.

Figure 7:
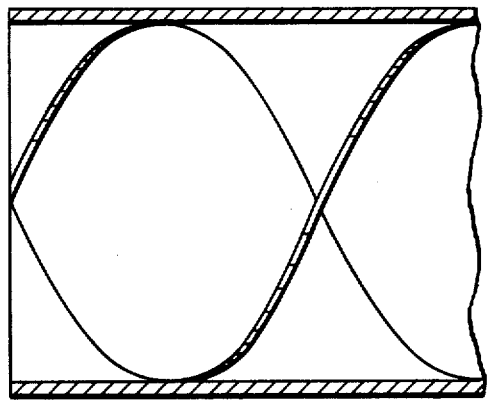
Figure 8:
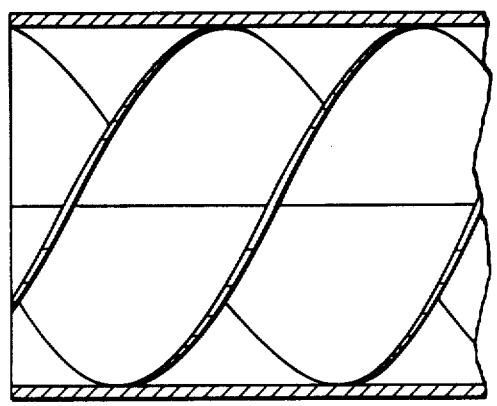

FIGS. 7 and 8 represent the pertinent longitudinal sections.

What we claim is:

1. A method of adhesive culture fermenting a working liquid and producing microorganisms which comprises producing a relative flow between said liquid surrounding microorganisms adhering to the surfaces of a large number of solid bodies which are freely movable within said liquid, said bodies each having a volume of about 1 to 1,000 mm$^3$ and having a specific gravity different from that of said liquid, and continuously moving the liquid and the freely movable bodies in a circulating flow passing in a spiral path through a plurality of elongated tubes of small cross sectional area disposed in side-by-side relationship, said tubes having a helical core and forming a circuit for said circulating flow.

2. A method according to claim 1, wherein on the surface of the bodies a layer of adhering components comprising tissues of multi-celled organisms are adhered to said surfaces, and said tissues or for example viruses living in said tissues are produced.

3. A method according to claim 1, characterized in that in spite of producing microorganisms a reaction takes place between components in said liquid and components selected from the group consisting of catalysts, enzymes, or crude oil, which in spite of microorganisms, adhere to said surfaces.

4. The method of claim 1 wherein said freely movable bodies are in the shape of filaments or rods.

5. In the method of carrying out biochemical reactions between microorganisms and a nutrient liquid in the presence of a gas the improvement comprising adding to the liquid a large number of solid bodies which are freely movable within the liquid and which provide a large surface area for the adherence of microorganisms, said bodies each having a volume of about 1 to 1,000 mm$^3$ and having a specific gravity different from that of the nutrient liquid, introducing bubbles of the gas into the nutrient liquid moving the liquid and the bodies in a circulating flow passing in a spiral path through a plurality of elongated tubes of small cross sectional area disposed in side-by-side relationship, said tubes having a helical core and forming a circuit for said circulating flow, and separating the gas from the liquid.

6. The method of claim 4 wherein said bodies are in the shape of filaments or rods.

7. In the method of carrying out biochemical reactions between microorganisms adhered to solid surfaces and a nutrient liquid in the presence of gas bubbles by passing streams of nutrient liquid through a plurality of elongated tubes of small cross section disposed in side-by-side relationship, the improvement which comprises increasing the area of contact between the microorganisms and the liquid by guiding the streams into contact with spiral cores disposed in the tubes to thereby increase the solid surface area available to the microorganisms.

8. A method as in claim 7 including adding to the streams of liquid a large number of small freely movable solid bodies which provide a large surface area for the adherence of microorganisms, said bodies each having a specific gravity different from that of the nutrient liquid and having a volume of about 1 to 1,000 mm$^3$, and effecting flow of the liquid relative to the bodies as the streams and bodies pass through the tubes.

9. The method according to claim 8 wherein said solid bodies are shaped as filaments or rods.

* * * * *